(12) United States Patent
Signorello et al.

(10) Patent No.: US 12,254,070 B1
(45) Date of Patent: Mar. 18, 2025

(54) LIVENESS DETECTION

(71) Applicant: Jumio Corporation, Palo Alto, CA (US)

(72) Inventors: Gina Signorello, Palo Alto, CA (US); Labhesh Patel, Palo Alto, CA (US)

(73) Assignee: Jumio Corporation, Sunnyvale, CA (US)

( * ) Notice: Subject to any disclaimer, the term of this patent is extended or adjusted under 35 U.S.C. 154(b) by 334 days.

(21) Appl. No.: 17/566,196

(22) Filed: Dec. 30, 2021

(51) Int. Cl.
*G06F 21/32* (2013.01)
*G06F 3/01* (2006.01)

(52) U.S. Cl.
CPC .............. *G06F 21/32* (2013.01); *G06F 3/011* (2013.01); *G06F 3/017* (2013.01)

(58) Field of Classification Search
CPC .. G06F 21/32; G06F 21/45; G06F 2221/2133; G06F 2221/2103; H04L 63/0861; H04L 63/08; H04L 9/3231; H04L 9/3271; H04L 2463/082
See application file for complete search history.

(56) References Cited

U.S. PATENT DOCUMENTS

| | | | |
|---|---|---|---|
| 9,590,985 B2 * | 3/2017 | Bentley | H04L 63/0846 |
| 10,599,934 B1 | 3/2020 | Lowe et al. | |
| 10,735,959 B2 | 8/2020 | LeCun et al. | |
| 2009/0133106 A1 * | 5/2009 | Bentley | G06F 21/32 726/5 |
| 2010/0321304 A1 | 12/2010 | Rofougaran | |
| 2014/0307929 A1 | 10/2014 | Nechyba et al. | |
| 2015/0033305 A1 * | 1/2015 | Shear | G06F 21/53 726/11 |
| 2016/0092665 A1 * | 3/2016 | Cowan | H04W 12/06 726/9 |
| 2016/0371555 A1 * | 12/2016 | Derakhshani | G01S 15/10 |
| 2017/0076145 A1 * | 3/2017 | Gottemukkula | G06V 10/751 |
| 2017/0345146 A1 | 11/2017 | Fan | |
| 2018/0046852 A1 | 2/2018 | Ionita | |
| 2018/0101721 A1 * | 4/2018 | Nienhouse | B60K 28/063 |
| 2019/0050618 A1 * | 2/2019 | Khuri-Yakub | G06F 3/0436 |
| 2019/0197331 A1 * | 6/2019 | Kwak | G06F 16/00 |

(Continued)

FOREIGN PATENT DOCUMENTS

| | | | | |
|---|---|---|---|---|
| WO | WO-2018175603 A1 * | 9/2018 | | A61B 5/024 |
| WO | WO-2019089432 A1 * | 5/2019 | | G01S 15/32 |

OTHER PUBLICATIONS

Ali et al., "Gaze stability for liveness detection," Pattern Analysis and Applications, vol. 21, Nov. 10, 2016, pp. 437-449, available online at https://link.springer.com/article/10.1007/s10044-016-0587-2.

*Primary Examiner* — Tae K Kim
(74) *Attorney, Agent, or Firm* — PATENT LAW WORKS LLP

(57) ABSTRACT

The disclosure includes a system and method for detecting liveness including: generating, using one or more processors, a first cue for presentation to a user via a client device, the first cue for inducing a first action when the user is live; receiving, using the one or more processors, a first set of sensor data for a time subsequent to the first cue and representing a user response to the first cue; determining, using the one or more processors, a first liveness signal based on the first set of sensor data; and acting, using the one or more processors, based on the first liveness signal.

20 Claims, 9 Drawing Sheets

(56) References Cited

U.S. PATENT DOCUMENTS

| | | | | |
|---|---|---|---|---|
| 2019/0311101 A1* | 10/2019 | Nienhouse | ............ | A61B 5/1176 |
| 2019/0377963 A1* | 12/2019 | Hamid | ................. | G06V 40/172 |
| 2020/0027293 A1 | 1/2020 | Edwards | | |
| 2020/0296132 A1 | 9/2020 | Lv et al. | | |
| 2020/0309930 A1* | 10/2020 | Zhou | ........................ | G01S 15/86 |
| 2020/0342245 A1* | 10/2020 | Lubin | .................... | G06V 40/70 |
| 2021/0251567 A1* | 8/2021 | Wu | ....................... | A61B 5/7239 |
| 2021/0334570 A1* | 10/2021 | Hamid | .................... | G06V 20/64 |
| 2022/0172729 A1* | 6/2022 | Mohajer | ................. | G06F 16/25 |
| 2022/0391482 A1* | 12/2022 | Villanueva Gaviola | ...................... | G06F 3/0482 |
| 2023/0108664 A1* | 4/2023 | Kim | ....................... | G06V 40/40 |
| | | | | 382/115 |

* cited by examiner

LIVENESS DETECTION

BACKGROUND

The present disclosure relates to verification of identify. More specifically, the present disclosure relates to confirming liveness of a user in conjunction with identity confirmation or verification.

Entities, such as governments, businesses, and individuals, may seek to confirm an identity of a person for any number of reasons including: to protect information or digital assets (e.g., bank accounts, password manager accounts, etc.), to protect physical assets (e.g., doors, vaults, borders, etc.), to comply with laws and regulations (e.g., anti-money laundering or other banking regulations), or other reasons. To confirm an identity, a comparison is often made between an attribute (e.g., face) of the person present and a reference documentation associated with that attribute (e.g., photo ID showing the person's face).

SUMMARY

This specification relates to methods and systems for detecting liveness of a user. According to one aspect of the subject matter described in this disclosure, a computer-implemented method of detecting liveness includes generating, using one or more processors, a first cue for presentation to a user via a client device, the first cue for inducing a first action when the user is live; receiving, using the one or more processors, a first set of sensor data for a time subsequent to the first cue and representing a user response to the first cue; determining, using the one or more processors, a first liveness signal based on the first set of sensor data; and acting, using the one or more processors, based on the first liveness signal.

Other implementations of one or more of these aspects include corresponding systems, apparatus, and computer programs, configured to perform the actions of the methods, encoded on computer storage devices.

These and other implementations may each optionally include one or more of the following features. For instance, the first action includes the user breathing. For instance, the first liveness signal is based on breath of the user. For instance, the first liveness signal is based on breath of the user and includes one or more of a visual detection of breath fog and a pressure created by the user breathing, the pressure represented in the first set of sensor data. For instance, the first liveness signal is based on a haptic response. For instance, the first liveness signal is based on a haptic response and includes a change of user state in response to the first cue, where the first cue includes a vibration of the client device. For instance, the first cue is generated based on the selected, first liveness signal and the set of conditions. For instance, the set of conditions includes one or more of a client device condition and an environmental condition. For instance, the method may include: receiving a second set of sensor data, and determining a second liveness signal based on the second set of sensor data. For instance, the acting based on the first liveness signal is further based on the second liveness signal.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

The present disclosure is described in the context of an example liveness detector and use cases; however, those skilled in the art should recognize that the liveness detector may be applied to other environments and use cases without departing from the disclosure herein.

To confirm an identity, a comparison is made between an attribute (e.g., a biometric such as a signature, voice, face, retina, palm print, fingerprint, etc.) of the person present and a reference documentation associated with that attribute (e.g., copy of the person's signature, recording of the person's voice, photo ID showing the person's face, scan data of the user's retina, palm, finger(s), etc., respectively). For example, a user wishing to establish his/her identity with an entity, e.g., a government agency or a commercial enterprise, the user may be asked to submit his/her image taken live during the identity establishment process through the entity's application on his/her mobile phone or through the entity's portal on a web browser. The entity may, depending on the implementation, check that the image thus taken matches the photo on an identification document that the user has submitted in order to verify the person's identity, store the image for later identification purposes, or do both.

When confirming an identity remotely or electronically, determining that the attribute received for comparison to the reference documentation is being received from the actual person with whom the attribute is associated, and not being provided by a third-party fraudster looking to mislead the entity, presents technical challenges, which are not present when a person physically presents himself/herself in the physical world along with his/her identification document for comparison. For example, a user attempting to mislead the entity about his/her identity may submit an image of another person for comparison to the reference documentation using an image of that person taken earlier (e.g., by holding the photo on a stolen ID card to the device's camera, playing a recorded video of someone else's face, etc.). As another example, a user may submit a synthetically generated, or altered, face in front of the camera.

Moreover, fraudsters may leverage technology to automate a series of repeated, fraudulent attempts to mislead an entity until a successful vector of attack is discovered, and their attacks may become increasingly more sophisticated to trick existing attempts to determine liveness (e.g., graduating from holding up a picture to generating deep fakes).

The liveness detector 226 described herein may beneficially detect such fraudulent occurrences by determining liveness, i.e., that the user is a live person currently present at the device, and describes new liveness signals for determining liveness.

Figure 1:
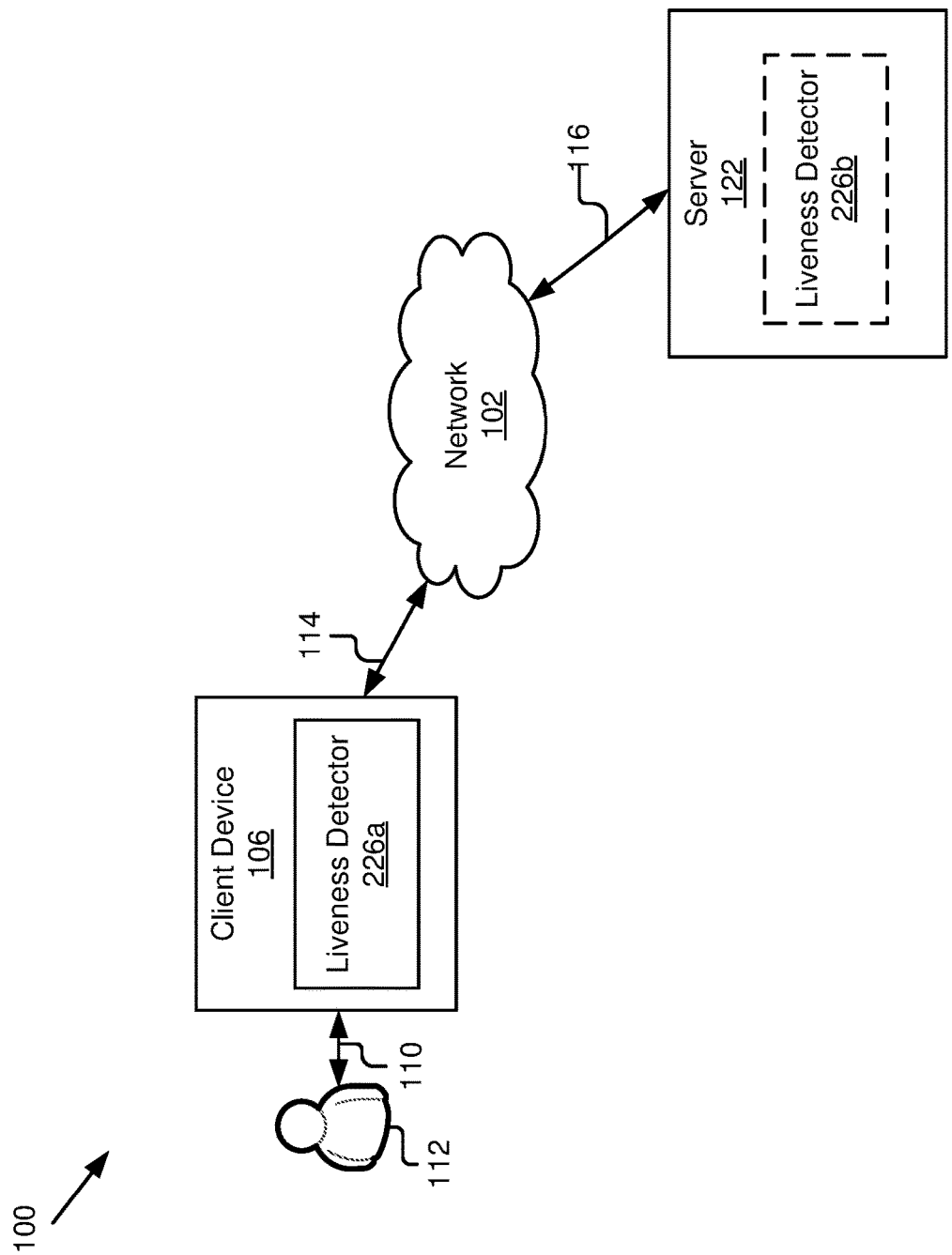
FIG. 1 is a block diagram of one example implementation of a system for detecting liveness in accordance with some implementations.

FIG. 1 is a block diagram of an example system 100 for liveness detection in accordance with some implementations. As depicted, the system 100 includes a server 122 and a client device 106 coupled for electronic communication via a network 102.

The client device 106 is a computing device that includes a processor, a memory, and network communication capabilities (e.g., a communication unit). The client device 106 is coupled for electronic communication to the network 102 as illustrated by signal line 114. In some implementations, the client device 106 may send and receive data to and from other entities of the system 100 (e.g., a server 122). Examples of client devices 106 may include, but are not limited to, mobile phones (e.g., feature phones, smart phones, etc.), tablets, laptops, desktops, netbooks, portable media players, personal digital assistants, etc.

Although only a single client device 106 is shown in FIG. 1, it should be understood that there may be any number of client devices 106. It should be understood that the system 100 depicted in FIG. 1 is provided by way of example and the system 100 and/or further systems contemplated by this present disclosure may include additional and/or fewer components, may combine components and/or divide one or more of the components into additional components, etc. For example, the system 100 may include any number of client devices 106, networks 102, or servers 122.

The network 102 may be a conventional type, wired and/or wireless, and may have numerous different configurations including a star configuration, token ring configuration, or other configurations. For example, the network 102 may include one or more local area networks (LAN), wide area networks (WAN) (e.g., the Internet), personal area networks (PAN), public networks, private networks, virtual networks, virtual private networks, peer-to-peer networks, near field networks (e.g., Bluetooth®, NFC, etc.), cellular (e.g., 4G or 5G), and/or other interconnected data paths across which multiple devices may communicate.

The server 122 is a computing device that includes a hardware and/or virtual server that includes a processor, a memory, and network communication capabilities (e.g., a communication unit. The server 122 may be communicatively coupled to the network 102, as indicated by signal line 116. In some implementations, the server 122 may send and receive data to and from other entities of the system 100 (e.g., one or more client devices 106).

Other variations and/or combinations are also possible and contemplated. It should be understood that the system 100 illustrated in FIG. 1 is representative of an example system and that a variety of different system environments and configurations are contemplated and are within the scope of the present disclosure. For example, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Furthermore, various entities of the system may be integrated into a single computing device or system or divided into additional computing devices or systems, etc.

For example, as depicted, the client device 106 may include an instance of the liveness detector 226a and the server 122 may optionally (as indicated by the dashed lines) include an instance of the liveness detector 226b. However, in some implementations, the components and functionality of the liveness detector 226 may be entirely client-side (i.e., at 226a), entirely server side (i.e., at 226b), or divide among the client device 106 and server 122 (i.e., divided across 226a and 226b).

Figure 2:
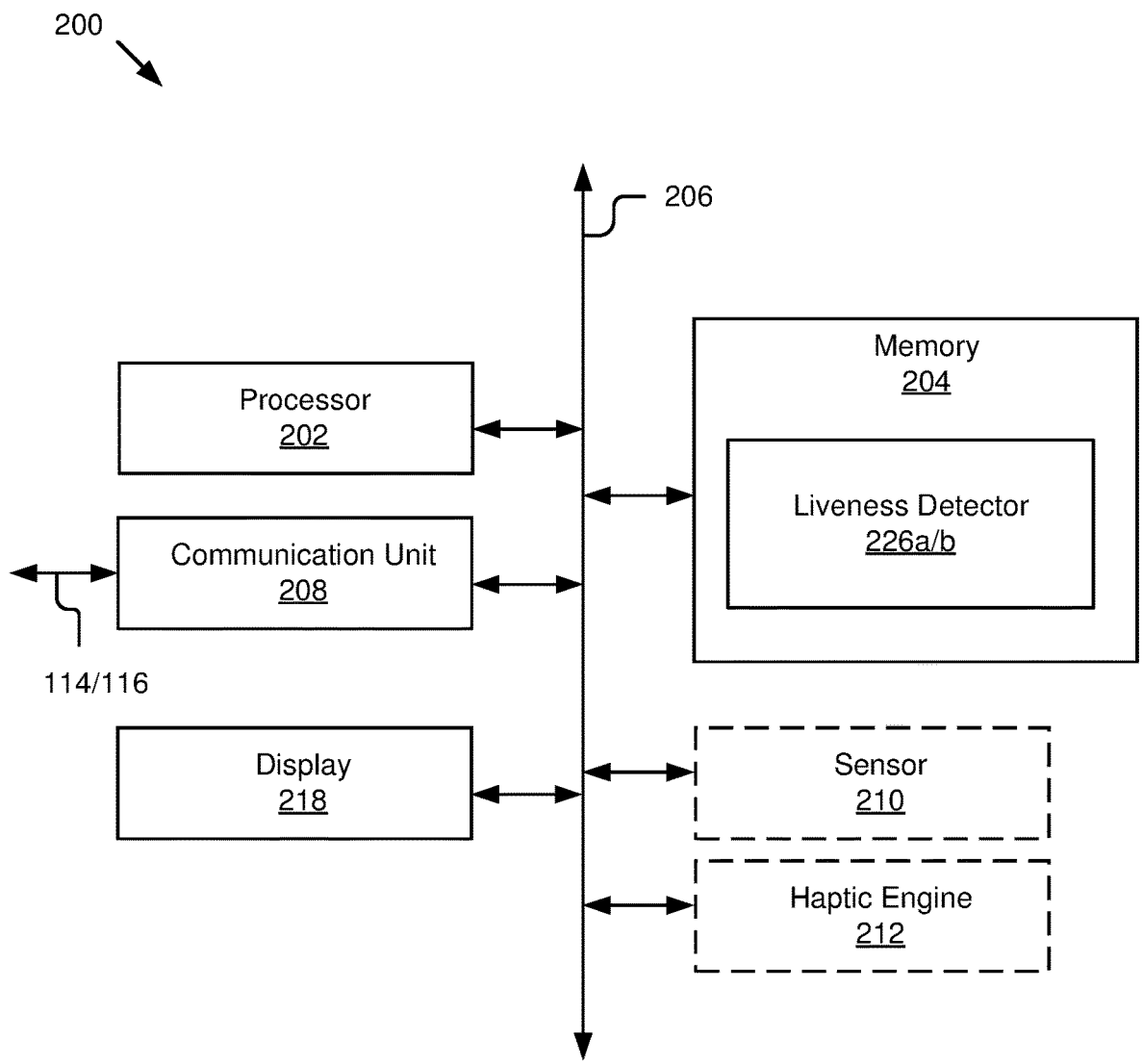
FIG. 2 is a block diagram of an example computing device in accordance with some implementations.

FIG. 2 is a block diagram of an example computing device 200 including an instance of the liveness detector 226a/b. In the illustrated example, the computing device 200 includes a processor 202, a memory 204, a communication unit 208, and a display 218. In some implementations, the computing device 200 is a client device 106, the memory 204 stores the liveness detector 226a, and the communication unit 208 is communicatively coupled to the network 102 via signal line 114. In some implementations, the computing device 200 is a client device 106, which may occasionally be referred to herein as a user device, and the client device 106 optionally includes at least one sensor and a haptic engine 212. In another implementation, the computing device 200 is a server 122, the memory 204 stores the liveness detector 226b, and the communication unit 208 is communicatively coupled to the network 102 via signal line 116.

The processor 202 may execute software instructions by performing various input/output, logical, and/or mathematical operations. The processor 202 may have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual, and may include a single processing unit or a plurality of processing units and/or cores. In some implementations, the processor 202 may be capable of generating and providing electronic display signals to a display device, supporting the display of images, capturing and transmitting images, and performing complex tasks and determinations. In some implementations, the processor 202 may be coupled to the memory 204 via the bus 206 to access data and instructions therefrom and store data therein. The bus 206 may couple the processor 202 to the other components of the computing device 200 including, for example, the memory 204, the communication unit 208.

The memory 204 may store and provide access to data for the other components of the computing device. The memory 204 may be included in a single computing device or distributed among a plurality of computing devices. In some implementations, the memory 204 may store instructions and/or data that may be executed by the processor 202. The instructions and/or data may include code for performing the techniques described herein. For example, in one implementation, the memory 204 may store an instance of the liveness detector 226a/b. The memory 204 is also capable of storing other instructions and data, including, for example, an operating system, hardware drivers, other software applications, databases, etc. The memory 204 may be coupled to the bus 206 for communication with the processor 202 and the other components of the computing device 200.

The memory 204 may include one or more non-transitory computer-usable (e.g., readable, writeable) device, a static random access memory (SRAM) device, a dynamic random access memory (DRAM) device, an embedded memory device, a discrete memory device (e.g., a PROM, FPROM, ROM), a hard disk drive, an optical disk drive (CD, DVD, Blu-ray™, etc.) mediums, which can be any tangible apparatus or device that can contain, store, communicate, or transport instructions, data, computer programs, software, code, routines, etc., for processing by or in connection with the processor 202. In some implementations, the memory 204 may include one or more of volatile memory and non-volatile memory. It should be understood that the memory 204 may be a single device or may include multiple types of devices and configurations.

The communication unit 208 is hardware for receiving and transmitting data by linking the processor 202 to the network 102 and other processing systems. The communication unit 208 receives data and transmits the data via the network 102. The communication unit 208 is coupled to the bus 206. In one implementation, the communication unit 208 may include a port for direct physical connection to the network 102 or to another communication channel. For example, the computing device 200 may be the server 122, and the communication unit 208 may include an RJ45 port or similar port for wired communication with the network 102. In another implementation, the communication unit 208 may include a wireless transceiver (not shown) for exchanging data with the network 102 or any other communication channel using one or more wireless communication methods, such as IEEE 802.11, IEEE 802.16, Bluetooth® or another suitable wireless communication method.

In yet another implementation, the communication unit 208 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another implementation, the communication unit 208 may include a wired port and a wireless transceiver. The communication unit 208 also provides other connections to the network 102 for distribution of files and/or media objects using standard network protocols such as TCP/IP, HTTP, HTTPS, and SMTP as will be understood to those skilled in the art.

The display 218 is a conventional type such as a liquid crystal display (LCD), light emitting diode (LED), touchscreen, or any other similarly equipped display device, screen, or monitor. The display 218 represents any device equipped to display electronic images and data as described herein.

It should be apparent to one skilled in the art that other processors, operating systems, inputs (e.g., keyboard, mouse, one or more sensors, etc.), outputs (e.g., a speaker, display, haptic motor, etc.), and physical configurations are possible and within the scope of the disclosure. Examples of sensors (not shown) include, but are not limited to, a microphone, a speaker, a camera, a thermal camera, a pointer sensor (e.g., a capacitive touchscreen or mouse), a gyroscope, an accelerometer, a galvanic sensor, thermocouple, heart rate monitor, breathing monitor, electroencephalogram (EEG), iris scanner, fingerprint reader, raster scanner, palm print reader, an inertial sensor, global positioning system (GPS) sensor, etc.

In some implementations, the liveness detector 226 provides the features and functionalities described below responsive to a request. For example, a request on behalf of an entity (not shown) to determine whether a user is live.

Figure 3:
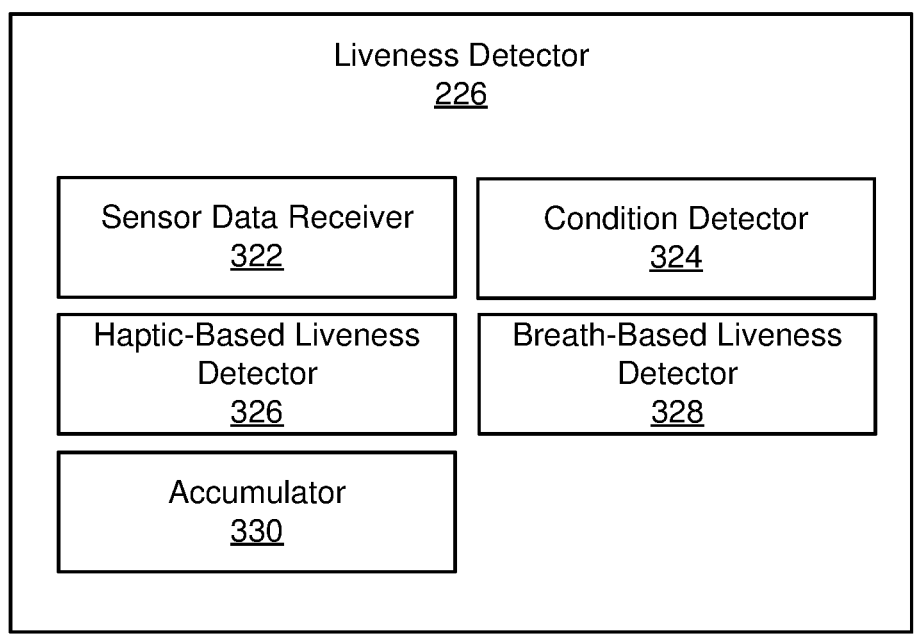
FIG. 3 is a block diagram of an example liveness detector in accordance with some implementations.

Referring now to FIG. 3, a block diagram of an example of liveness detector 226 is illustrated in accordance with one implementation. As illustrated in FIG. 3, the liveness detector 226 may include a sensor data receiver 322, a condition detector 324, a haptic-based liveness detector 326, a breath-based liveness detector 328, and an accumulator 330.

The sensor data receiver 322 is communicatively coupled to one or more sensors and receives sensor data from one or more sensors. Examples of sensor data may include, but are not limited to, camera data (e.g., single image or video, thermal or visible/conventional), heart rate monitor data, galvanic sweat sensor data, EEG data, thermocouple (temperature) data, breathing sensor data (e.g., from a wearable sensor dedicated to sensing breathing), gyroscope data, accelerometer data, pointer sensor data (e.g., from a capacitive touchscreen or mouse), audio data (e.g., from a microphone and/or speaker), etc.

In some implementations, the sensor data receiver 322 receives more than one kind of sensor data. For example, the sensor data receiver 322 receives sensor data from a combination of sensors including, but not limited to, (1) camera and gyroscope; (2) camera and accelerometer; (3) camera and pointer sensor; (4) camera, gyroscope, and accelerometer; (5) camera, gyroscope, and pointer sensor; (6) camera, accelerometer, and pointer sensor; (7) camera, gyroscope, accelerometer, and pointer sensor; (8) gyroscope and accelerometer; (9) gyroscope and pointer sensor; (10) gyroscope, accelerometer, and pointer sensor; (11) accelerometer and pointer sensor; (12) gyroscope and audio sensor; (13) pointer sensor and audio sensor; (14) accelerometer and audio sensor; (15) camera and audio sensor; (16) audio sensor, gyroscope, and accelerometer; (17) audio sensor, gyroscope, and pointer sensor; (18) audio sensor, accelerometer, and pointer sensor; (19) audio sensor, gyroscope, accelerometer, and pointer sensor; (20) camera, audio sensor, and accelerometer; (21) camera, audio sensor, and pointer sensor; (22) camera, audio sensor, accelerometer, and pointer sensor; (23) camera, gyroscope, and audio sensor; (24) camera, gyroscope, audio sensor, and pointer sensor; (25) camera, gyroscope, accelerometer, and audio sensor; (26) camera, gyroscope, accelerometer, audio sensor, and pointer sensor; etc.

In some implementations, the sensor data receiver 322 receives different sensor data sets at different times. For example, in some implementations, the sensor data receiver 322 may receive a first set of sensor data describing an environmental condition of the user 112 and/or client device 106 (e.g., the ambient temperature based on a temperature reading by a thermocouple) at a first time, and at a second, later time, receive a second set of sensor data from one or more of a camera, a pointer device (e.g. a capacitive touch screen), a microphone, and a speaker representing a user action, a liveness signal, or both.

In some implementations, the sensor data received by the sensor data receiver 322 includes sensor data captured during a time period associated with, or in relation to, one or more cues, for example, subsequent to a cue. In some implementations, the sensor data includes sensor data captured during a time period beginning within a first threshold period of a cue being presented to the user (e.g., at the time of the presentation of a cue or +X milliseconds from the presentation of a cue) and having a second period of duration (e.g., Y milliseconds). The values of X and Y may vary depending on the implementation. For example, X may be selected from the range of 0 to 10 milliseconds. The value of Y may be selected from the range of 0.5 seconds to 2 minutes. In some implementations, the second period of duration (i.e., Y milliseconds) may vary based on one or more of the cue, a type (or sub-type) of user action being induced by the cue, and an expected latency associated therewith. For example, when the cue vibrating the phone (i.e., haptic), when the user is not looking at the phone, to induce the user to look at the phone, a first, shorter period of time (e.g., 1 second) may be captured and used by the haptic-based liveness determiner 326 to determine whether the user's gaze turned to the phone. In another example, when the cue includes vibrating the phone (i.e., haptic), when the user is not looking at the phone, to induce the user to look at the phone, a first, shorter period of time (e.g., 1 second) may be captured (e.g., by the camera sensor) and used by the haptic-based liveness determiner 328 to determine whether the user's gaze turned to the phone. In another example, when the cue includes vibrating the phone (i.e., haptic), when the user is not within a field of view of the camera, to induce the user to look at and/or pick up the phone, a second, longer period of time (e.g., 45 seconds) may be captured (e.g., by the camera sensor, accelerometer, etc.) and used by the haptic-based liveness determiner 326 to determine whether the user appears and/or the device is physically manipulated.

While the foregoing examples refer to haptic cues and haptic-based liveness detection, analogous periods and variations may apply to breath-based cues and breath-based liveness detection. For example, when the cue induces the user to speak (e.g., say a randomly selected word, phrase, or noise) or to breath on a forward-facing camera, a first, shorter period of time (e.g., 7 second) may be sufficient to capture (e.g., by one or more of a microphone, a speaker, touchscreen, forward facing camera, etc.) the user action induced and may be used by the breath-based liveness determiner 328 to determine whether the force/pressure of the user's breath was detected when the phrase was uttered by the user 112 and/or the forward-facing lens was fogged by the user 112 and the video leading up to the fogging is consistent with a user 112 moving their face in to breath on the forward-facing camera. In another example, when the cue induces the user to keep their face within an area of the screen associated with an area within the field of view of a forward-facing camera, a second, longer period of time (e.g., 1 to 5 minutes) may be used to capture (e.g., by one or more of a microphone, a speaker, touchscreen, forward facing camera, etc.) the user action and may be used by the breath-based liveness determiner 328 to determine whether the force/pressure of the user's breath was detected by an audio sensor, and whether those pressures correspond to breathing in the audio and/or video recorded in that period.

In the foregoing examples, the time period is described as a predetermined quantity of time. However, in some implementations, the time period may be dynamic and/or event-driven. For example, the sensor data received includes sensor data received between a first event and a second event. Examples of events include, but are not limited to, a beginning of a workflow (e.g., secure login, account creation, financial transaction, etc.) for which liveness detection is requested, an end of a workflow (e.g., secure login, account creation, financial transaction, etc.) for which liveness detection is requested, a beginning of a step in a workflow (e.g., presentation of a user-fillable form) for which liveness detection is requested, an end of a step in a workflow for which liveness detection is requested, presentation of a cue to induce a user action (e.g. breath, change in state, etc.), conclusion of the user action (e.g., the user has finished uttering a requested phrase, or fogged a lens), etc.

In some implementations, the sensor data is time stamped so that sensor data from multiple devices may be put into temporal context. In some implementations, the user device may time stamp sensor data by default. In some implementations, the sensor data receiver 322 may receive a stream of sensor data in real-time, or near real time, and apply time stamps and store the sensor date (e.g., in memory 204 or another storage medium).

In some implementations, the sensor data receiver 322 communicates the sensor data to, or stores the sensor data for retrieval by, one or more of the condition detector 324, the haptic-based liveness detector 326, one or more subcomponents of the haptic-based liveness detector 326, the breath-based liveness determiner 328, and one or more subcomponents of the breath-based liveness determiner 328. For example, in some implementations, condition detector 324 may obtain the received sensor data, or a subset thereof, and detect a condition represented by the sensor data. In another example, in some implementations, the haptic-based liveness detector 326, or one or more subcomponents thereof, may obtain the sensor data, or a subset thereof, and determine a haptic-based liveness signal based on the obtained sensor data. In yet another example, in some implementations, the breath-based liveness determiner 328, or one or more subcomponents thereof, may obtain the sensor data, or a subset thereof, and detect a breath-based liveness signal based on the obtained sensor data.

The condition detector 324 detects a set of conditions. In some implementations, the set of conditions may include a device condition, an environmental condition, or a combination of an environmental condition and device condition.

In some implementations, the condition detector 324 determines one or more device conditions. A device condition describes a condition associated with the user's device (e.g., the client device 106). Examples of device conditions include, but are not limited to, a device type (e.g., tablet, smartphone, laptop, desktop, etc.); a device manufacturer; information describing a device's sensor suite, which may include the sensors incorporated in the device (e.g., built-in sensors), the sensors communicatively coupled to the device (e.g., wearable sensors paired to the device such as a watch, fitness tracker, etc.) or both; information describing sensors included in the sensor suite, such as detection ranges, detection resolutions/sensitivity, sub-type of sensor (e.g., whether the touchscreen is capacitive or resistive, whether the microphone is electret or MEMS, whether a camera is infrared/thermal or visible/conventional, etc.); operating system, which may include the version; browser or application, which may include the version; an identifier associated with the device (e.g., an electronic serial number, IP address, MAC address, etc.); device location, which may be physical (e.g., GPS coordinates, street address, etc.) or virtual (e.g., IP address, ISP, mobile network, network, VPN, etc.); etc.

In some implementations, the condition detector 324 determines one or more environmental conditions. An environmental condition describes a condition associated with an environment of the user 112 and/or the user's device (e.g., the client device 106). Examples of environmental conditions include, but are not limited to, a temperature, time of day, weather (e.g., windy, relative humidity, below freezing, etc.), indoor vs. outdoor, lighting conditions (e.g., number or light sources, intensity, etc.), ambient noise levels, etc.

In some implementations, the condition detector 324 detects a set of conditions, at least in part, based on sensor data. In some implementations, a condition may be determined directly from sensor data. For example, when sensor data includes temperature readings, the temperature (i.e., an environmental condition) may be determined directly from that sensor data in some implementations. In another example, when sensor data includes data from a touchscreen, an image, a GPS location, accelerometer, and gyroscope data, in some implementations, the condition detector may determine a set of device conditions directly from the sensor data, such as the presence of a touchscreen, a GPS sensor, an accelerometer, and a gyroscope, and possibly a sensitivity of the respective sensors (e.g., based on a range of readings and/or resolution of readings in the sensor data). In some implementations, the condition detector 324 detects a condition indirectly based on the sensor data. For example, the condition detector 324 receives images and a GPS location, determines, based on the images, that the device is outside, determines, based on the GPS location, a current temperature for that GPS location from a weather forecast, and determines whether the temperature is sufficiently low that a user's breath fog is likely visible. In another example, the condition detector 324 receives images and a GPS location, determines, based on the images, that the device is outside, determines, based on the GPS location, a wind condition for that GPS location from a weather forecast, and determines whether the wind condition is sufficiently low that the wind is unlikely to create a false positive based on pressure, disperse the user's breath before the breath fog is likely to be visible or otherwise obscure the user's breath.

In some implementations, the condition detector 324 detects a set of conditions, at least in part, based on reference data. For example, the condition detector 324 detects that the device is an iPhone 13 Pro and searches reference data to obtain device conditions including, but not limited to, information describing the sensors suite integrated into the handset by the manufacturer and information describing those sensors.

In some implementations, the condition detector 324 is communicatively coupled to one or more of the haptic-based liveness detector 326 and the breath-based liveness determiner 328. For example, the condition detector 324 signals the haptic-based liveness detector 326, or a subcomponent thereof, to induce a haptic-based liveness detection, and the breath-based liveness determiner 328, or a subcomponent thereof, to induce a breath-based liveness detection is to be induced.

It should be recognized that, while the illustrated implementation of FIG. 3 includes both a haptic-based liveness detector 326 and a breath-based liveness determiner 328, some implementations may determine liveness based on a single type (i.e., breath or haptic) and such an implementation may omit the module associated with the unused type. For example, the haptic-based liveness detector 326 may be omitted in implementations that do not perform a haptic-based liveness determination, and the breath-based liveness determiner 328 may be omitted in implementations that do not perform a breath-based liveness determination.

Figure 4:
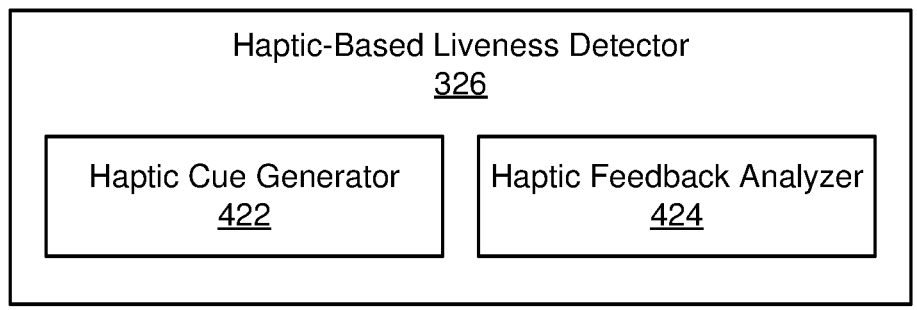
FIG. 4 is a block diagram of an example haptic-based liveness detector in accordance with some implementations.

Referring now to FIG. 4, a block diagram of an example haptic-based liveness detector 326 is illustrated in accordance with some implementations. As illustrated in FIG. 4, the haptic-based liveness detector 326 includes a haptic cue generator 422 and a haptic feedback analyzer 424.

In some implementations, the haptic cue generator 422 is communicatively coupled to the sensor data receiver 322 to receive sensor data and determine a presence of a first state. In some implementations, the haptic cue generator 422 is communicatively coupled to the condition determiner 324 to determine whether the device includes a haptic engine 212, which sensors are present in sensor suite and what change(s) of user state those sensors may detect. The haptic cue generator 422 generates one or more haptic cues. In some implementations, a haptic cue causes a haptic engine 212 in the user's device (e.g., client device 106) to vibrate.

In some implementations, the haptic cue generator 422 generates a haptic cue to induce a change of state in the user 112. Examples of change of state include, but are not limited to, inducing a user 112 who is not looking at the device (i.e., a first state) to look at the device (i.e., a second state); inducing a user 112 who is not holding the phone (i.e., a first state) to pick up or otherwise physically manipulate the phone (i.e., a second state); inducing a user 112 who is not within view of the camera (i.e., a first state) to move into view of the camera (i.e., a second state), inducing a startle response (i.e. a change from a first, steady state to a second, startled state), etc.

In some implementations, the haptic cue generator 422 selects a type of haptic-based liveness signal based on the set of conditions. For example, the haptic cue generator 422 selects whether a liveness signal based on what change of state (e.g., looking at the phone) it to be determined and generates the cue based on that selection.

In some implementations, the haptic cue generator 422 varies a timing of the cue. In some implementations, the haptic cue generator 422 may artificially vary a timing of the cue. For example, the haptic generator 422 may vary a timing, or use, of an abrupt and intense haptic vibration, so that the cue is more likely to be startling and less likely to be anticipated. In some implementations, the haptic cue generator 422 may use a random number generator to determine whether and/or when to generate and present a haptic cue to the user 112.

In some implementations, a timing of the haptic cue generated by the haptic cue generator 422 may vary organically, based on the variation from user-to-user and/or interaction-to-interaction. For example, in implementations, where a cue is responsive to determining a first state (e.g., a distracted state in which the user is not looking at the device), the timing of that first state, and, therefore, the cue responsive to that first state would vary from instance to instance, and may not occur in instances where a user is particularly focused on the device, and, in such a scenario, a cue to induce a different change of state or use a different basis for liveness (e.g. breath) may be applied.

The haptic cue generator 422 generates and then sends a sequence of cues for presentation to the user. In some implementations, a length of the sequence generated by the haptic cue generator 422 may be dynamic. For example, the sequence randomly varies in a number of cues, the period of time over which the cues are presented, or both to thwart replay attacks.

The haptic cue generator 422 is communicatively coupled to the client device 106 to cause presentation of the cue to the user 112.

The haptic feedback analyzer 424 is communicatively coupled to the sensor data receiver 322, receives sensor data, and determines, based on the sensor data, a haptic-based liveness signal. In some implementations, the haptic feedback analyzer 424 determines a liveness signal including determining whether the haptic cue is associated with a change of state. For example, the haptic feedback analyzer 424 determines, based on the sensor data, whether the user reacted to the haptic cue, thereby changing the user's state and indicating liveness.

In some implementations, the haptic feedback analyzer 424 determines the haptic-based liveness signal based on one or more profiles derived from sensor data. Examples of profiles include, but are not limited to, a visual profile, an audio profile, and a motion profile.

In some implementations, the haptic feedback analyzer 424 generates the visual profile by performing analysis on camera sensor data (e.g., video of the user) to represent user action. For example, the haptic feedback analyzer 424 may apply, depending on the implementation, gaze tracking, eye tracking, or a machine learning model trained on video to determine whether a user was looking away then looked at the device responsive to the haptic cue. In another example, the haptic feedback analyzer 424 may apply, depending on the implementation, object detection or facial recognition to video to determine whether a user enters the field of the camera's view responsive to the haptic cue.

In some implementations, the haptic feedback analyzer 424 generates the audio profile by performing analysis on microphone sensor data (e.g., an audio recording of the user) to represent human action. For example, the haptic feedback analyzer 424 may analyze audio for a gasp, "whoa," "what was that" or another audible user action responsive to the haptic cue.

In some implementations, the haptic feedback analyzer 424 generates the motion profile by performing analysis on sensor data (e.g., one or more of inertial, accelerometer, and gyroscopic data) to represent human action. For example, the haptic feedback analyzer 424 may determine whether device was picked up, turned over, moved, or otherwise physically manipulated responsive to the haptic cue.

In some implementations, the haptic feedback analyzer 424 determines a haptic-based liveness signal based on the one or more profiles. For example, the haptic feedback analyzer 424 may analyze a correlation between the various profiles and the cue(s) and/or correlation with one another. For example, when the visual profile indicates movement of what is in frame that is inconsistent with the motion of the device from the motion profile, it May indicate, to the haptic feedback analyzer 424, a lack of liveness (e.g., the video is a deep fake or video recording).

The haptic feedback analyzer 424 determines a haptic-based liveness signal. The haptic-based liveness signal represents whether a user action was responsive to the haptic cue and likely indicative of a live user 112. In some implementations, the haptic-based liveness signal may be binary, e.g., pass/fail, live/not alive, 0/1. In some implementations, the liveness signal may be continuous, e.g., a probability or confidence score of liveness. For example, the haptic liveness signal may be, by way of example and not limitation, a decimal between 0 and 1, an integer between 0 and 100, etc.

The haptic feedback analyzer 424 is communicatively coupled to the accumulator. For example, in some implementations, the haptic feedback analyzer 424 may send the haptic-based liveness signal to the accumulator 330. In another example, the haptic feedback analyzer 424 may store the haptic-based liveness signal in memory 204, or other storage medium, for retrieval by the accumulator 330.

Figure 5:
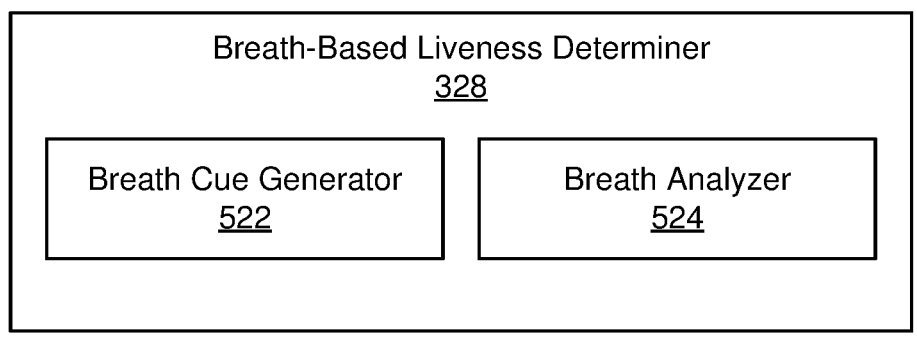
FIG. 5 is a block diagram of an example breath-based liveness detector in accordance with some implementations.

Referring now to FIG. 5, a block diagram of an example breath-based liveness determiner 328 is illustrated in accordance with one implementation. As illustrated in FIG. 5, the breath-based liveness determiner 328 may include a breath cue generator 522 and a breath analyzer in accordance with some implementations.

The breath cue generator 522 is communicatively coupled to the condition determiner 324 to receive a set of one or more conditions and determine one or more cues (or types of cues) based on the set of conditions. In some implementations, the breath cue generator 522 selects a type of haptic-based liveness signal based on the set of conditions. For example, the breath cue generator 522 selects whether a liveness signal based on breath visibility, detection of breath pressure, or both is to be determined and generates the cue based on that selection.

In some implementations, the breath cue generator 522 determines one or more cues based, at least in part, on a device condition. For example, the breath cue generator 522 determines what type(s) of breathing (i.e., a user action) are potentially detectable based on the available sensors. In another example, the breath cue generator 522 may determine whether the microphone is of a type that is able to, or sensitive enough to, detect pressure signals from a user's breath. In another example, the breath cue generator 522 may determine whether the speaker is able to detect a pressure from a user's breath, e.g., as a back pressure. In yet another example, the breath cue generator 522 may determine whether the client device's touchscreen is sensitive enough to register a pressure from a user's breath, e.g., in a change of capacitance, in the touch screen.

In some implementations, the breath cue generator 522 determines one or more cues based, at least in part, on an environmental condition. For example, the breath cue generator 522 determines whether one or more of the user is outside, the current outdoor temperature at the device's location, and relative humidity at that location such that as user's breath is likely to result in a visible fog.

Figure 9:
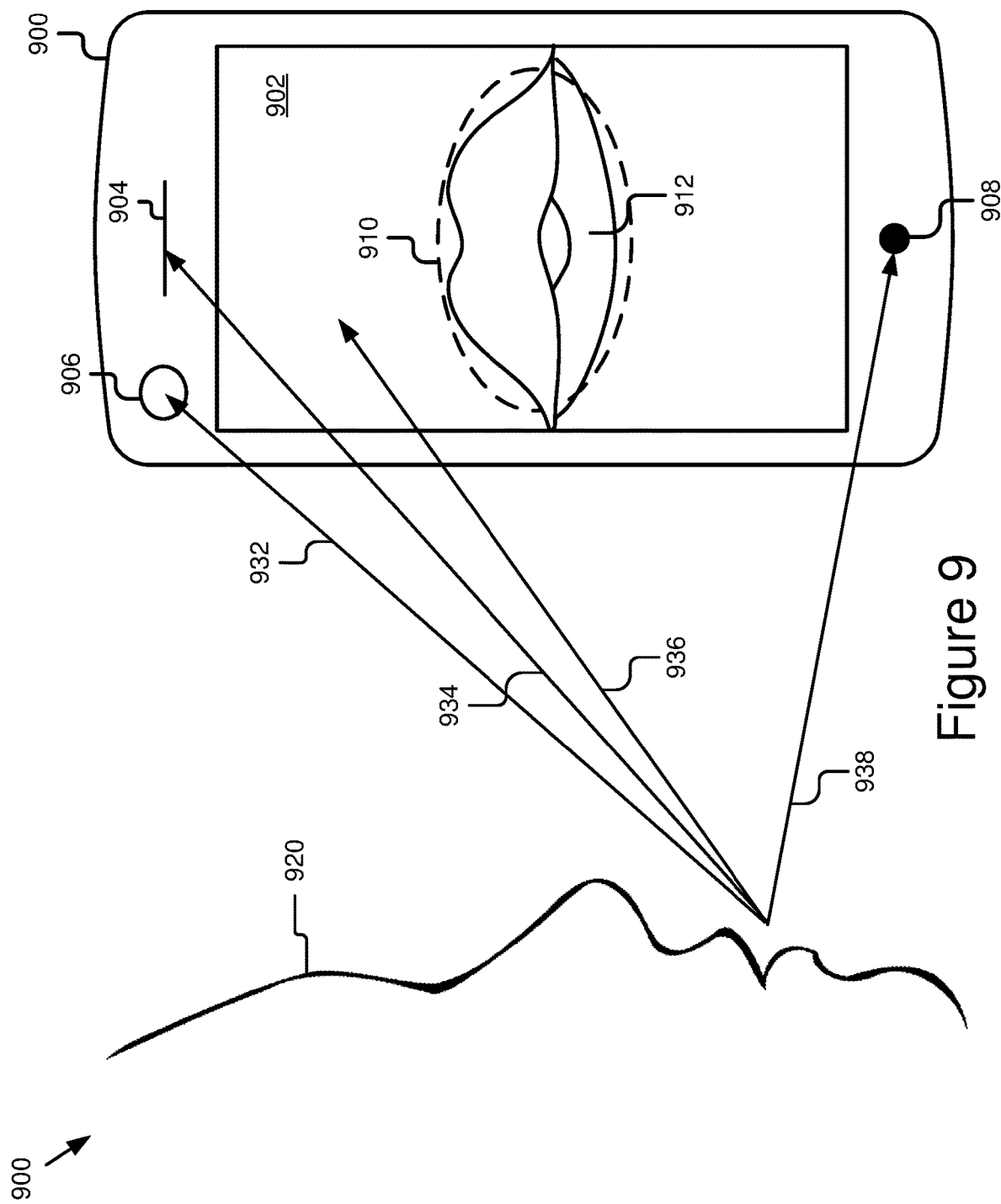
FIG. 9 illustrates a breath cue and user action in accordance with some implementations.

Referring also to FIG. 9, an example breath cue and user action is illustrated in accordance with some implementations. The breath cue generator 522 generates one or more breath cues. The type of breath cue may vary based on a variety of factors, including, but not limited to, one or more of the set of conditions, a randomization, etc. For example, when a microphone 908 and/or touchscreen 902 is able (based on device condition) to detect the pressure of the user's breath, the cue generated may be a visual cue 910 prompting the user 112 to position his/her face relative to the forward-facing camera to fill a portion of the screen, which causes the user's face to be in close proximity to the microphone and/or touchscreen. For example, as illustrated in FIG. 9, the cue 910 may induce the user 112 to move his/her head 920 relative to the camera 906 to a predetermined position. As illustrated the predetermined position is one in which the user's mouth 912 appears centered in and breaks the boundary defined by the dashed-oval cue 910. It should be recognized that the position of the cue 910, the body part 912 to be positioned relative to the cue 910, and the cue's relative position on the screen 902 are merely one example, and that other cues, facial features, and positions on the screen may be used to position the user relative to the user device 900 and its components 902, 904, 906, and 908, and are within the scope of this disclosure.

In some implementations, the cue may, optionally, induce the user to utter a phrase, word, or sound (e.g., make the "T" sound, which generally causes a particular pressure impulse as the user blocks the air with his/her tongue and then releases the air to make the sound). It should be recognized that the "T" sound is merely one possible example, and that other sounds, which may or may not also be plosives (i.e., p, b, t, d, k, g), may be used and detected. For example, the air released by the user when uttering a plosive may be one or more of incident on, and detected by, the touchscreen 902, as represented by vector 936; incident on, and detected by, the microphone 908, as represented by vector 938; and incident on, and detected by, the speaker 904, as represented by vector 934.

In another example, when the cue induces the user to fog the forward-facing camera, the cue may ask (audibly and/or visually) the user 112 to breath on the forward-facing camera, as represented by vector 932. In another example, when the cue induces the user to breath within the field of view of the forward-facing camera so that the presence of foggy breath may be determined, the cue may visually prompt the user 112 to position his/her face relative to the forward-facing camera to fill a portion of the screen, which causes the user's face and a predetermined margin around the face to be within the field of view of the forward-facing camera so that the breath fog may be captured by the camera.

In some implementations, the breath cue generator 522 generates a cue that is a non-dedicated cue. For example, when liveness is being detected during an account creation on a mobile (e.g., a banking app.), the breath cue may include presentation of a user-fillable form that's part of the account creation workflow, where the user's face (and any breath fog) would be visible as the user is likely holding the device, looking at it, and entering his/her information.

In some implementations, the breath cue generator 522 varies the cue(s) generated. In some implementations, the breath cue generator 522 may vary a timing of the cue. For example, when the breath cue generator 522 cues a user to hold the device close to his/her face. In some implementations, the type of cue may vary based on conditions. For example, if environmental conditions are such that breath fog is unlikely (e.g., 100 degrees and low humidity), a cue intended to induce a lens fogging or induce the user to position such that the user's breath is in frame for the camera are not used in some implementations. In some implementations, the breath cue generator 522 may vary what type of cue to generate. For example, when conditions are such that foggy breath is likely and the touchscreen is sensitive enough to register the pressure of a user's breath, the breath cue generator 522 may vary whether to cue the user to generate visible foggy breath, breath/speak near the touchscreen, or both. In some implementations, the breath cue generator 522 may vary a sequence of cues. For example, inducing the user to fog the lens and, after that, speak a phrase near the touchscreen during one liveness determination event, and inducing a (perhaps different) user to perform the actions in the opposite order another time. In some implementations, one or more of the aforementioned variations may be implemented using a random number generator (not shown). It should be recognized that the variation in timing, cue, cue type, and sequence may thwart replay attacks.

The breath cue generator 522 is communicatively coupled to the client device 106 to cause presentation of the cue to the user 112.

The breath analyzer 524 is communicatively coupled to the sensor data receiver 322, receives sensor data, and determines, based on the sensor data, a breath-based liveness signal. The breath analyzer 524 determines a breath-based liveness signal based on sensor data. In some implementations, the breath analyzer determines a breath-based cue is associated with a user breath. For example, the breath analyzer 524 determines, based on the sensor data, whether the user breath is detectable and/or associated with a cue, which may be indicative of liveness.

In some implementations, the breath analyzer 524 determines one or more breath-based liveness signals based on one or more profiles derived from sensor data. Examples of profiles include, but are not limited to, a visual profile, an audio profile, a motion profile, and a pressure profile.

In some implementations, the breath analyzer 524 generates the visual profile by performing analysis on camera sensor data (e.g., video of the user) to represent user action. For example, the breath analyzer 524 may apply, depending on the implementation, object recognition or a machine learning model trained on video or image data to determine whether a user's foggy breath is visible. In another example, the breath analyzer 524 may analyze the video or image data to determine whether a user's mouth moves closer to the lens and whether the lens subsequently becomes fogged. In yet another example, the breath analyzer 524 May apply, depending on the implementation, object detection or facial recognition to image or video to determine a user's visible motion relative to camera.

In some implementations, the breath analyzer 524 generates the audio profile by performing analysis on microphone sensor data (e.g., an audio recording of the user) to represent human action. For example, the breath analyzer 524 may analyze audio for an audible breath or exhale, certain sounds (e.g., plosives such as p, b, t, d, k, g), etc.

In some implementations, the breath analyzer 524 generates the motion profile by performing analysis on sensor data (e.g., one or more of inertial, accelerometer, and gyroscopic data) to represent human action. For example, the breath analyzer 524 may determine whether how a user device is physically manipulated responsive to the breath cue.

In some implementations, the breath analyzer 524 generates the pressure profile by performing analysis on sensor data (e.g., audio sensor data and touch screen data) to represent human action. For example, the breath analyzer 524 may analyze a pressure profile to determine whether there are pressure fluctuations represented in the sensor data that are consistent with a user's breath profile.

In some implementations, the breath analyzer 524 determines a breath-based liveness signal based on the one or more profiles. For example, the breath analyzer 524 may analyze a correlation between the various profiles and the cue(s) and/or correlation with one another. For example, the breath analyzer 524 may analyze the audio profile to determine a timing of plosives, and determine whether pressure spikes are present in the pressure profile, as plosives are expected to be associated with a release of air created when a human mouth creates the sound, which may register as a pressure spike at approximately the same time, or shortly after, the sound.

In another example, the breath analyzer 524 may analyze the visual profile and correlate visible user actions with the pressure profile to determine whether the pressure profile represents an increase in detected pressures after the user moves toward the user device and a decrease in detected pressures after a user moves away from the user device, and/or whether the pressures detected on the screen and attributable to the user's breath are centered in a region of expectation. For example, when the cue for the user to frame his/her eye, nose, or mouth in a certain portion of the device's touchscreen using the forward-facing camera, the user's mouth may be expected to fall near a predetermined portion of a touchscreen, and the breath analyzer 524 may determine whether a pressure distribution detected by the touchscreen is consistent with a user's breath and centered in that predetermined region.

The breath analyzer 524 determines a breath-based liveness signal. The breath-based liveness signal represents whether a user action (i.e., breath) was detected, which is indicative of a live user 112. In some implementations, the breath-based liveness signal may be binary, e.g., pass/fail, live/not alive, 0/1. In some implementations, the breath-based liveness signal may be continuous, e.g., a probability or confidence score of liveness. For example, the breath-based liveness signal may be, by way of example and not limitation, a decimal between 0 and 1, an integer between 0 and 100, etc.

In some implementations and use cases, the breath-based liveness signal may be based on a single type of breath-based liveness detection (e.g., detection of visible breath fog in video). In some implementations and use cases, the breath-based liveness signal may be a composite of multiple breath-based liveness detections, e.g., when the set of conditions permit, the breath-based liveness signal may be a composite of the detection of visible breath fog in a video, and a correspondence of pressure spikes in the pressure profile and plosives in the audio profile.

In some implementations, the breath analyzer 524 may weight different constituent components of a composite breath-based liveness signal differently. For example, the weighting may be based on, but not limited to a predictive strength of liveness and detectability. For example, presence of visible breath fog may be highly predictive of liveness, but may be difficult to detect in certain temperature and/or relative humidity ranges, so the presence of breath fog may weigh highly, but its absence may not weigh highly, when the relative humidity and/or temperature are within a predefined set of ranges.

The breath analyzer 524 is communicatively coupled to the accumulator. For example, in some implementations, the breath analyzer 524 may send the breath-based liveness signal to the accumulator 330. In another example, the breath analyzer 524 may store the breath-based liveness signal in memory 204, or other storage medium, for retrieval by the accumulator 330.

In some implementation, an accumulator 330 generates an accumulative score. The accumulation may vary based on the implementation. Depending on the implementation, the accumulator may generate the accumulative score by applying a function. Examples of a function include, but are not limited to, a sum, weighted sum, average, or weighted average of the available liveness signals. In some implementations, the average or weighted average of available liveness signals may be used so that unavailable (e.g., because of environmental or device conditions) liveness signals do not drag the cumulative score down.

In some implementations, the accumulator 330 applies a function that weights different liveness signals differently. Depending on the implementation, the weighting may be fixed or dynamic. In some implementation, liveness signals that more accurately predict liveness may be given greater weight.

While the accumulative score is described above in reference to haptic-based and breath-based signals, it should be recognized, the additional liveness signals may be accumulated with one or more of the haptic-based and breath-based signals to generate an accumulative score and such implementations are within the scope of this description.

In some implementations, the liveness detector 226 may take an action based on an individual liveness signal (e.g., breath or haptic-based). In some implementations, the liveness detector 226 may take an action based on a plurality of liveness signals (e.g., based on the accumulative score). Examples of actions, include, but are not limited to, permitting a transaction, login, verification, request; rejecting a transaction, login, verification, request; escalating (e.g., requesting additional verification or authentication steps or referring for human review or intervention), etc.

Example Methods

Figure 6:
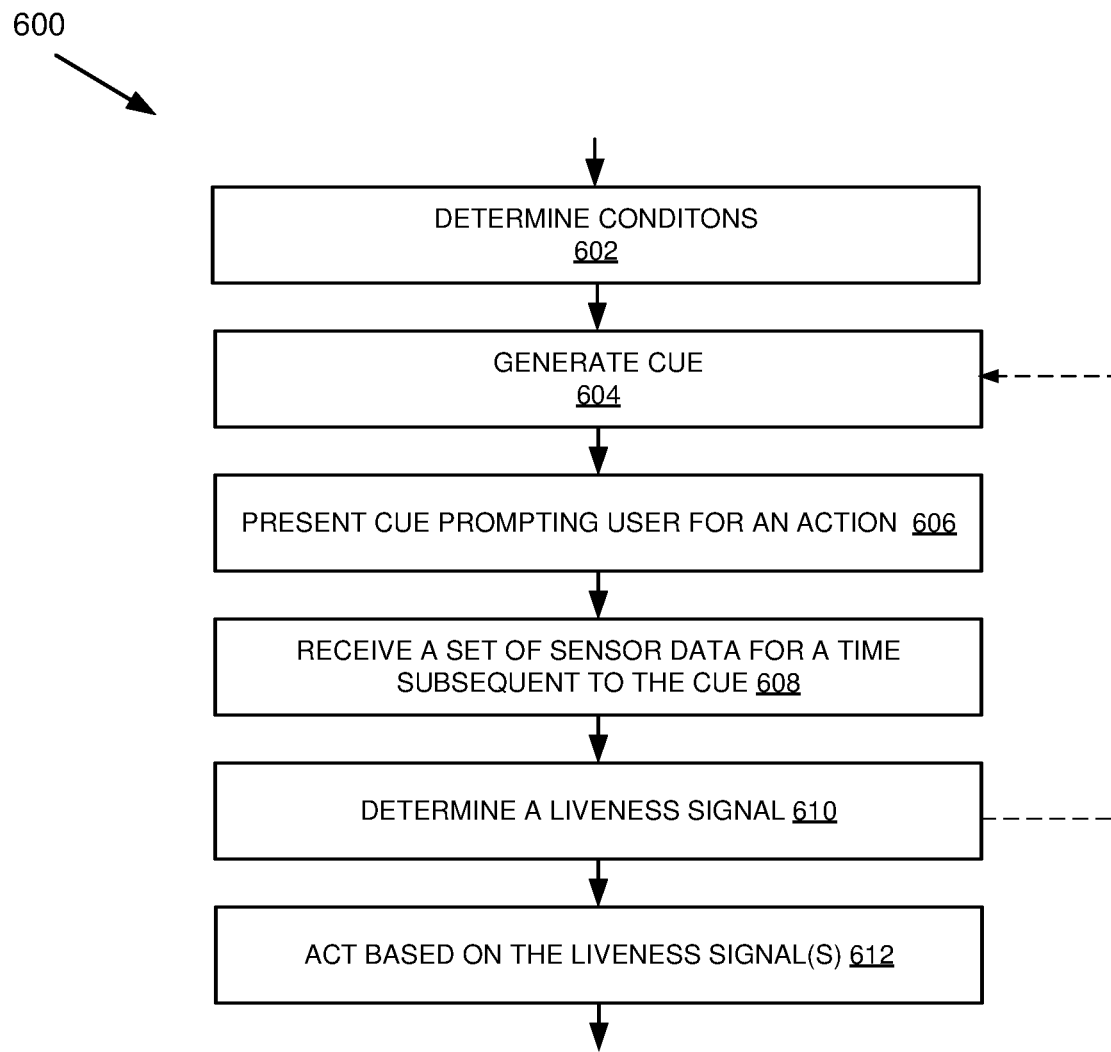
FIG. 6 is a flowchart of an example method for detecting liveness in accordance with some implementations.
Figure 7:
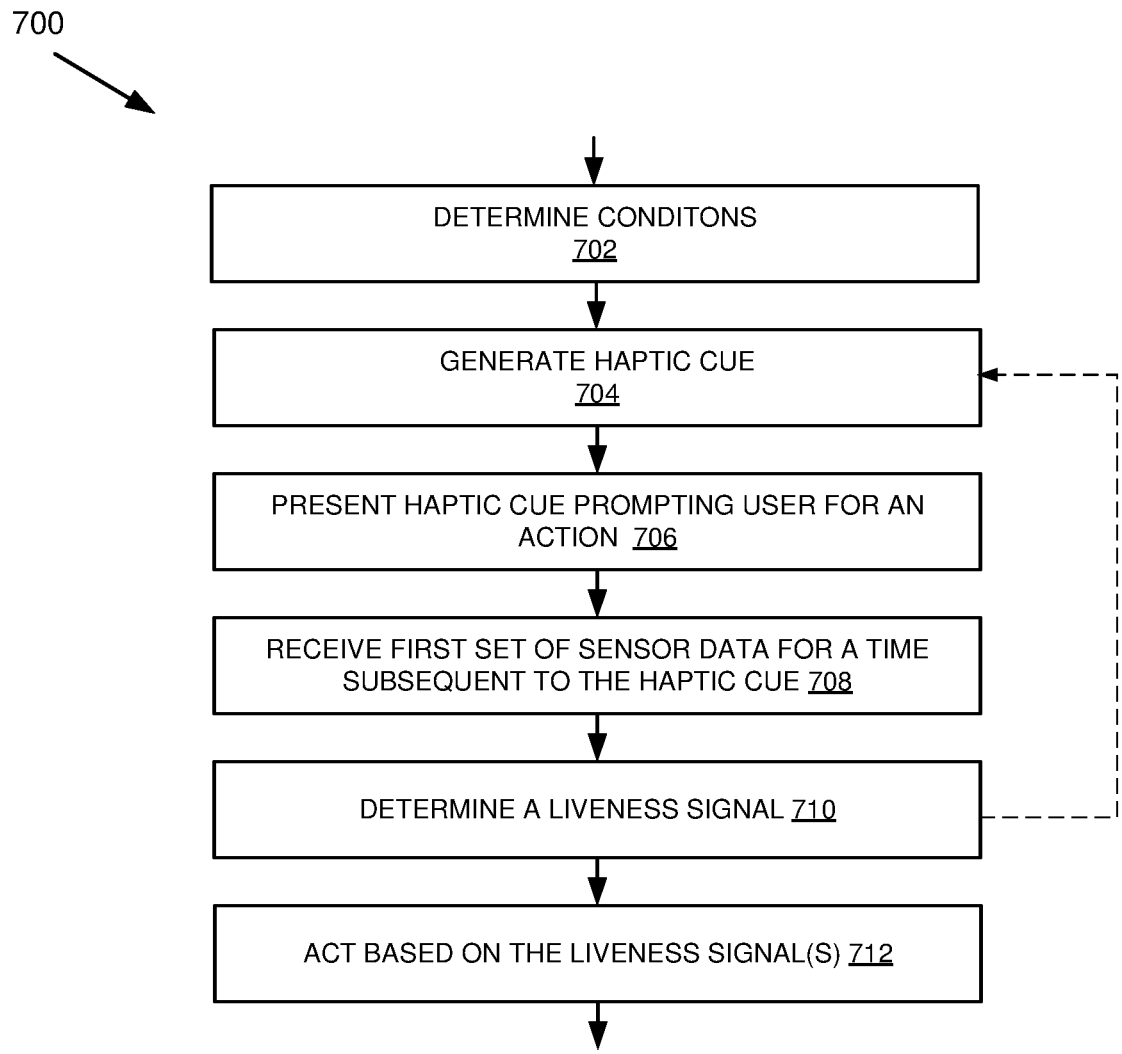
FIG. 7 is a flowchart of an example method for haptic-based liveness detection in accordance with some implementations.
Figure 8:
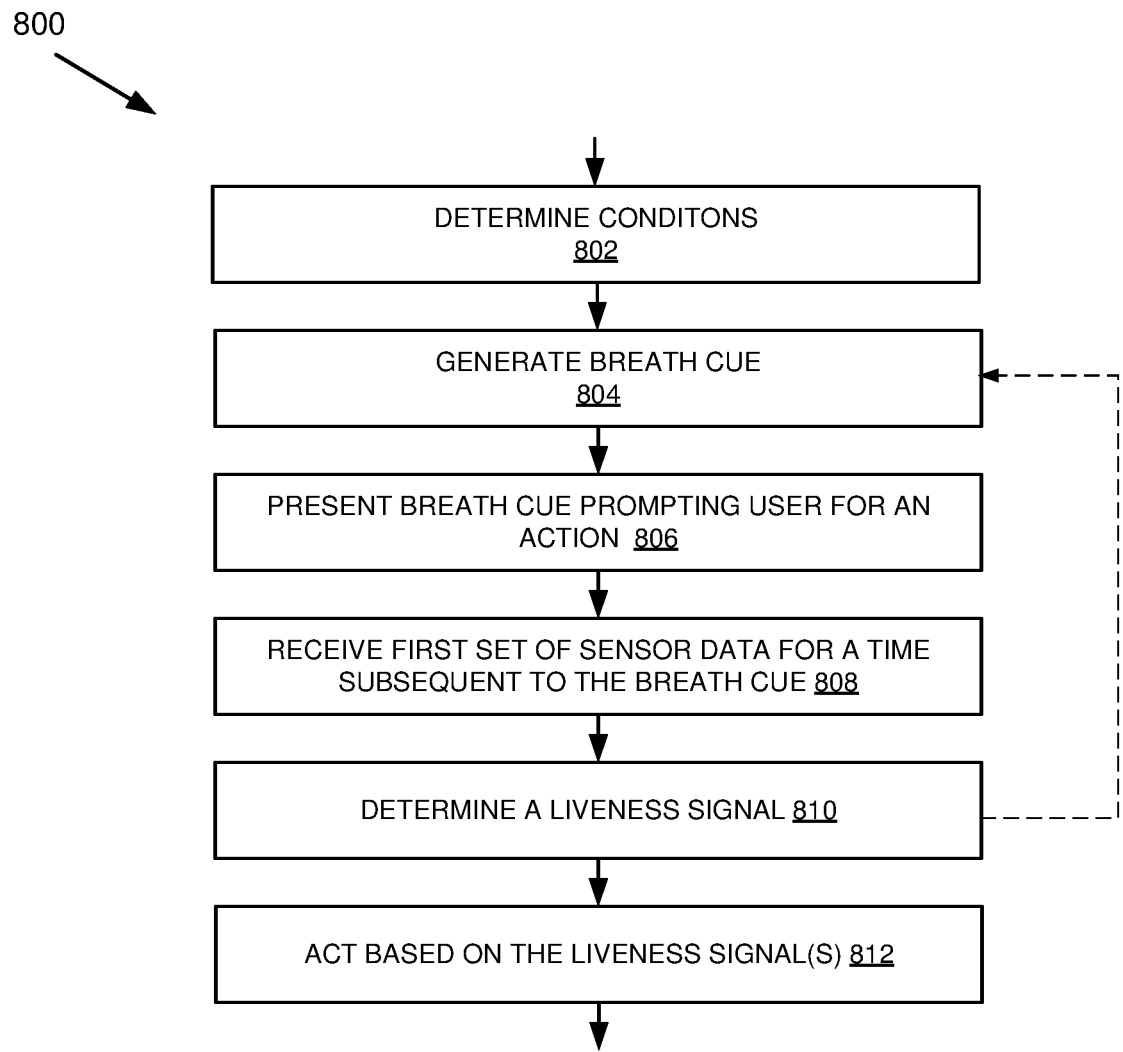
FIG. 8 is a flowchart of an example method for breath-based liveness detection in accordance with some implementations.

FIGS. 6-8 are flowcharts of example methods that may, in accordance with some implementations, be performed by the systems described above with reference to FIGS. 1-5 and 9. The methods 600-800 of FIGS. 6-8 are provided for illustrative purposes, and it should be understood that many variations exist and are within the scope of the disclosure herein.

FIG. 6 is a flowchart of an example method 600 for detecting liveness in accordance with some implementations. At block 602, the condition determiner 324 determines conditions. At block 604, one or more of the haptic cue generator 422 of the haptic-based liveness detector 326 and the breath cue generator 522 of the breath-based liveness detector 328 generates a cue. At block 606, the cue generated at block 604 is presented to a user 112 to prompt the user 112 for an action. At block 608, the one or more of the haptic feedback analyzer 424 of the haptic-based liveness detector 326 and the breath analyzer 524 of the breath-based liveness detector 328 receives a set of sensor data for a time subsequent to the cue. At block 610, one or more of the haptic feedback analyzer 424 of the haptic-based liveness detector 326 and the breath analyzer 524 of the breath-based liveness detector 328 determines a liveness signal. Depending on the implementation, blocks 604-608 and/or blocks 604-610 may be repeated. For example, to perform one or more of multiple breath-based liveness detections, multiple haptic-based detections, and a combination of breath-based and haptic-based liveness detection. At block 612, the accumulator 330 acts based on the liveness signal(s).

FIG. 7 is a flowchart of an example method 700 for haptic-based liveness detection in accordance with some implementations. At block 702, the condition determiner 324 determines conditions. At block 704, the haptic cue generator 422 generates a haptic cue. At block 706, the cue generated at block 704 is presented to a user 112 to prompt the user 112 for an action. At block 708, the haptic feedback analyzer 424 receives a set of sensor data for a time subsequent to the cue presented at block 706. At block 710, the haptic feedback analyzer 424 determines a liveness signal. Depending on the implementation, blocks 704-708 and/or blocks 704-710 may be repeated, for example, to perform multiple haptic-based detections. At block 712, the accumulator 330 acts based on the haptic-based liveness signal(s).

FIG. 8 is a flowchart of an example method 800 for breath-based liveness detection in accordance with some implementations. At block 802, the condition determiner 324 determines conditions. At block 804, the breath cue generator 522 generates a breath cue. At block 806, the cue generated at block 804 is presented to a user 112 to prompt the user 112 for an action. At block 808, the breath analyzer 524 receives a set of sensor data for a time subsequent to the cue presented at block 806. At block 810, the breath analyzer 524 determines a liveness signal. Depending on the implementation, blocks 804-808 and/or blocks 804-810 may be repeated, for example, to perform multiple breath-based liveness detections. At block 812, the accumulator 330 acts based on the breath-based liveness signal(s).

Other Considerations

It should be understood that the above-described examples are provided by way of illustration and not limitation and that numerous additional use cases are contemplated and encompassed by the present disclosure. In the above description, for purposes of explanation, numerous specific details are set forth in order to provide a thorough understanding of the present disclosure. However, it should be understood that the technology described herein may be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one implementation" or "an implementation" or "some implementations" means that a particular feature, structure, or characteristic described in connection with the implementation is included in at least one implementation. The appearances of the phrase "in some implementations" in various places in the specification are not necessarily all referring to the same implementations.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As should be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies, engines, and other aspects of the disclosure can be implemented as software, hardware, firmware, or any combination of the foregoing. Also, wherever an element, an example of which is a module, of the specification is implemented as software, the element can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer implemented method comprising:
   receiving, using one or more processors, a request for liveness determination;
   responsive to the request, determining, using one or more processors, a set of potential liveness signal types, the set of potential liveness signal types determined to be detectable based on a set of sensors determined to be available to a user's client device;
   generating, using the one or more processors and based on the determined set of potential liveness signal types, a first cue for presentation to the user via the client device, the first cue inducing a first action when the user is live, wherein the first cue includes a vibration of the client device;
   obtaining, using the one or more processors, a first set of sensor data for a first time prior to the first cue;
   obtaining, using the one or more processors, a second set of sensor data for a second time subsequent to the first cue and representing a user response to the first cue;
   determining, using the one or more processors, a first user state based on the first set of sensor data;
   determining, using the one or more processors, a second user state based on the second set of sensor data;
   determining, using the one or more processors, a change of user state from the first user state to the second user state, wherein the change of user state includes one or more of:
      the user turning the user's gaze to the client device responsive to the vibration,
      the user entering into view of a camera sensor associated with the client device responsive to the vibration, and
      a startle response from the user responsive to the vibration;
   determining, using the one or more processors, a first liveness signal based on the change of user state in response to the first cue; and
   responding, using the one or more processors, to the request based on the first liveness signal.

2. The computer implemented method of claim 1, further comprising determining a second liveness signal, wherein second liveness signal is based on breath of the user.

3. The computer implemented method of claim 2, wherein the second liveness signal includes a visual detection of breath fog in a human-visible spectrum.

4. The computer implemented method of claim 3, wherein the set of potential liveness signal types is further based on a set of current environmental conditions, the method further including:
   detecting the set of current environmental conditions based at least in part on a subset of the set of sensors available to the client device, wherein the set of current environmental conditions include one or more environmental conditions effecting breath visibility in the human-visible spectrum, the one or more environmental conditions effecting breath visibility in the human-visible spectrum including one or more of temperature, relative humidity, wind, and whether the client device is outside.

5. The computer implemented method of claim 1 further comprising:
   receiving a third set of sensor data; and
   determining a second liveness signal based on the third set of sensor data, wherein the first liveness signal and the second liveness signal are associated with different liveness signal types.

6. The computer implemented method of claim 5, further comprising:
   accumulating the first liveness signal and the second liveness signal, wherein the responding to the request based on the first liveness signal is further based on the second liveness signal.

7. The method of claim 1, further comprising:
   wherein the first set of sensor data includes one or more of first camera data, first gyroscopic data, and first accelerometer data, and
   wherein the second set of sensor data includes one or more of second camera data, second gyroscopic data, and second accelerometer data.

8. The method of claim 1, further comprising:
   wherein the first user state includes the user's gaze directed away from the client device;
   wherein the second user state includes the user's gaze directed toward the client device,
   wherein the first set of sensor data includes first camera data,
   wherein the second set of sensor data includes second camera data, and
   the change in user state includes the user turning the user's gaze to the client device responsive to the vibration, wherein the camera sensor associated with the client device generates the first and second camera data.

9. The method of claim 1, further comprising:
   wherein the first user state includes the user being out of view of the camera sensor associated with the client device;
   wherein the second user state includes the user being in view of the camera sensor associated with the client device,
   wherein the first set of sensor data includes first camera data,
   wherein the second set of sensor data includes second camera data, and
   the change in user state includes the user entering into view of the camera sensor associated with the client device responsive to the vibration, wherein the camera sensor generates the first and second camera data.

10. The method of claim 1, further comprising:
    wherein the first user state is a steady state;
    wherein the second user state is a startled state,
    wherein the first set of sensor data includes one or more of camera data, audio data, gyroscopic data, and accelerometer data,
    wherein the second set of sensor data includes one or more of camera data, audio data, gyroscopic data, and accelerometer data, and
    the change in user state includes the startle response from the user responsive to the vibration.

11. A system comprising:
a processor; and
a memory, the memory storing instructions that, when executed by the processor, cause the system to:
receive a request for liveness determination;
responsive to the request, determine a set of potential liveness signal types, the set of potential liveness signal types determined to be detectable based on a set of sensors determined to be available to a user's client device;
generate, based on the determined set of potential liveness signal types, a first cue for presentation to the user via the client device, the first cue inducing a first action when the user is live, wherein the first cue includes a vibration of the client device;
obtain a first set of sensor data for a first time prior to the first cue
obtain a second set of sensor data for a second time subsequent to the first cue and representing a user response to the first cue;
determine a first user state based on the first set of sensor data;
determine a second user state based on the second set of sensor data;
determine a change of user state from the first user state to the second user state, wherein the change of user state includes one or more of:
the user turning the user's gaze to the client device responsive to the vibration,
the user entering into view of a camera sensor associated with the client device responsive to the vibration, and
a startle response from the user responsive to the vibration;
determine a first liveness signal based on the change of user state responsive to the first cue; and
respond to the request based on the first liveness signal.

12. The system of claim 11, further comprising determining a second liveness signal, wherein second liveness signal is based on breath of the user.

13. The system of claim 12, wherein the second liveness signal includes a visual detection of breath fog in a human-visible spectrum.

14. The system of claim 13, wherein the set of potential liveness signal types is further based on a set of current environmental conditions, and the memory further stores instructions that, when executed by the processor, cause the system to:
detect the set of current environmental conditions based at least in part on a subset of the set of sensors available to the client device, wherein the set of current environmental conditions include one or more environmental conditions effecting breath visibility in the human-visible spectrum, the one or more environmental conditions effecting breath visibility in the human-visible spectrum including one or more of temperature, relative humidity, wind, and whether the client device is outside.

15. The system of claim 11, the memory further stores instructions that, when executed by the processor, cause the system to:
receiving a third set of sensor data; and
determining a second liveness signal based on the third set of sensor data, wherein the first liveness signal and the second liveness signal are associated with different liveness signal types.

16. The system of claim 15, the memory further stores instructions that, when executed by the processor, cause the system to:
accumulating the first liveness signal and the second liveness signal, wherein responding to the request based on the first liveness signal is further based on the second liveness signal.

17. The computer implemented method of claim 2, wherein
the second liveness signal includes detection of a pressure created by the user breathing.

18. The computer implemented method of claim 17, wherein the second liveness signal based on the user placing the client device in proximity to a user's mouth and the user performing an utterance, wherein the utterance, by the user, induces a pressure impulse represented in a third set of sensor data when the user is live.

19. The computer implemented method of claim 18, wherein the pressure impulse is represented in the third set of sensor data and the third set of sensor data representing the pressure impulse is generated at least in part by one or more of a speaker, a microphone, and a touchscreen.

20. The system of claim 12, wherein the second liveness signal includes detection of a pressure created by the user breathing.

* * * * *